United States Patent
Szadkowski et al.

(10) Patent No.: US 6,827,192 B2
(45) Date of Patent: Dec. 7, 2004

(54) RESILIENT PLATE FOR ADJUSTABLE CLUTCHES

(75) Inventors: Andrzej Szadkowski, Southern Pines, NC (US); Robert L. Page, Southern Pines, NC (US); Muneer Abusamra, Southern Pines, NC (US); Ronald B. Morford, Southern Pines, NC (US)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/132,362

(22) Filed: Apr. 25, 2002

(65) Prior Publication Data

US 2003/0201144 A1 Oct. 30, 2003

(51) Int. Cl.[7] .............................................. F16D 13/75
(52) U.S. Cl. ................. 192/70.25; 192/70.27; 192/89.24; 192/109 A
(58) Field of Search .................... 192/70.25, 70.27, 192/70.3, 109 A, 89.24

(56) References Cited

U.S. PATENT DOCUMENTS

| | | | | |
|---|---|---|---|---|
| 4,895,235 A | * | 1/1990 | Nishimura et al. | 192/70.25 |
| 5,069,322 A | * | 12/1991 | Mizukami et al. | 192/70.25 |
| 5,088,583 A | * | 2/1992 | Takeuchi et al. | 192/109 A |
| 5,088,584 A | * | 2/1992 | Inaba et al. | 192/109 A |
| 5,456,345 A | | 10/1995 | Bissett | |
| 5,715,920 A | * | 2/1998 | Lindner et al. | 192/70.25 |
| 5,823,312 A | | 10/1998 | Reik et al. | |
| 5,862,901 A | * | 1/1999 | Weiss et al. | 192/70.25 |
| 6,079,538 A | * | 6/2000 | de Briel et al. | 192/109 A |
| 6,085,883 A | * | 7/2000 | Kimmig et al. | 192/70.25 |
| 6,098,772 A | | 8/2000 | Kimmig et al. | |
| 6,123,180 A | * | 9/2000 | Weidinger | 192/70.25 |
| 6,161,669 A | * | 12/2000 | Lopez | 192/70.25 |

* cited by examiner

Primary Examiner—Rodney H. Bonck
(74) Attorney, Agent, or Firm—Cohen, Pontani, Lieberman & Pavane

(57) ABSTRACT

A clutch assembly includes a diaphragm spring to bias a retainer assembly toward an engaged position. The retainer assembly actuates a lever to force a pressure plate into torque transmitting contact with a friction disc and a flywheel. Clutch straps bias the pressure plates toward a disengaged position. An adjusting ring shifts toward the flywheel to accommodate for wear of the friction disc. A resilient plate is attached to the adjusting ring and exerts a biasing force against the diaphragm spring. As the adjuster ring shifts toward the flywheel, the biasing force of the clutch straps increases and the biasing force of the resilient plate decreases to provide a substantially uniform clamp load throughout the life of the friction disc.

16 Claims, 4 Drawing Sheets

RESILIENT PLATE FOR ADJUSTABLE CLUTCHES

BACKGROUND OF THE INVENTION

This invention relates to a clutch assembly for a motor vehicle and specifically to a clutch assembly that accommodates wear to maintain a substantially constant release load during the life of the clutch.

Typically, a clutch assembly includes a retainer assembly supported about a rotating axis and movable longitudinally along the axis. A clutch cover attaches to a flywheel for rotation about the axis and supports a pressure plate. The clutch couples the transmission to the engine by sandwiching friction discs between an intermediate plate, the pressure plate and the flywheel. A plurality of levers are connected between a retainer assembly and the pressure plates. A diaphragm spring moves the retainer assembly and thereby the levers toward the pressure plates and the flywheel. The force applied to the levers sandwiches the friction discs against the flywheel with a sufficient pressure or clamp load to transfer torque from the engine to the transmission. Clutch straps bias the pressure plates away from the flywheel toward a release or disengaged position.

During normal operation of the clutch assembly, the diaphragm spring biases the retainer assembly toward an engaged position. In the engaged position the diaphragm spring overcomes the biasing force of the clutch straps toward the release position. An additional force pulls the retainer assembly away from the flywheel, thereby releasing the levers and the pressure plates. Typically, an operator depressing a clutch pedal provides the additional force. Maintaining a uniform clamp load throughout the life of the clutch is desirable.

However, during normal use, the friction discs wear. As the friction discs wear, forces exerted on the pressure plates increases in proportion to the increased distance that the pressure plate must travel to engage the friction discs. Further, the biasing load exerted by the diaphragm spring decreases as the distance increases. The result is lower clamp loads against the driven disc resulting in less efficient transfer of torque.

Accordingly, there is a need for a clutch assembly that maintains substantially constant clamp loads throughout the life of the friction discs.

SUMMARY OF THE INVENTION

An embodiment disclosed in this application is a clutch assembly for maintaining a substantially constant clamp load and pedal effort throughout various clutch wear conditions.

The clutch assembly includes a friction discs with a width of friction material. A clutch cover fastened to a flywheel rotates about an axis and a pressure plate and intermediate plate operably associated with the clutch cover rotate with the clutch cover. The pressure plate and intermediate plate move longitudinally along the axis to engage friction discs. The pressure plate and intermediate plate are biased to a release position by a plurality of clutch straps.

A retainer bearing assembly is disposed along the shaft and rotates with the clutch cover. The retainer bearing assembly moves axially along the shaft to engage at least one lever. A diaphragm spring biases the retainer bearing assembly toward the flywheel pushing the levers against the pressure plates to cause contact between the pressure plate, intermediate plate, the friction discs and the flywheel. The biasing force of the diaphragm spring overcomes the opposing biasing force of the clutch straps and applies a clamp load against the flywheel.

During normal wear of the friction discs, a width of the friction material decreases thereby requiring the retainer bearing assembly to travel a greater longitudinal distance along the axis. The biasing load exerted by the diaphragm spring on the retainer bearing assembly decreases as the distance of travel along the axis increases. Further, the biasing load exerted by the clutch straps against the biasing load of the diaphragm spring increases as the pressure plate and intermediate plate moves closer to the flywheel. This combination results in an overall lower clamp load.

An adjusting ring is movable mounted within the clutch cover. The adjusting ring supports one end of the lever. As the friction discs wear, the adjusting ring is moved toward the pressure plate to accommodate wear. However, movement of the adjusting ring does not account for the changes in the total clamping force obtained by the interaction of the diaphragm spring against the clutch straps. The present invention utilizes a resilient plate mounted to the adjusting ring that includes a plurality of extending fingers operably associated with the retainer bearing assembly.

During operation, the resilient plate exerts a biasing force against the diaphragm spring. As the friction discs wear and the adjusting ring moves toward the flywheel, the retainer assembly engages the fingers later and later during travel between the release position and the engaged position. This results in less deflection of the fingers, and less biasing force against the diaphragm spring. Concurrently, as the adjusting ring shifts towards the flywheel, the biasing force exerted by the clutch straps increases. The increase in clutch strap biasing force is substantially offset by the decrease in resilient plate biasing force resulting in substantially insignificant changes in the combined force exerted against the diaphragm spring such that clamp loads remain substantially uniform over the useful life of the friction discs.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
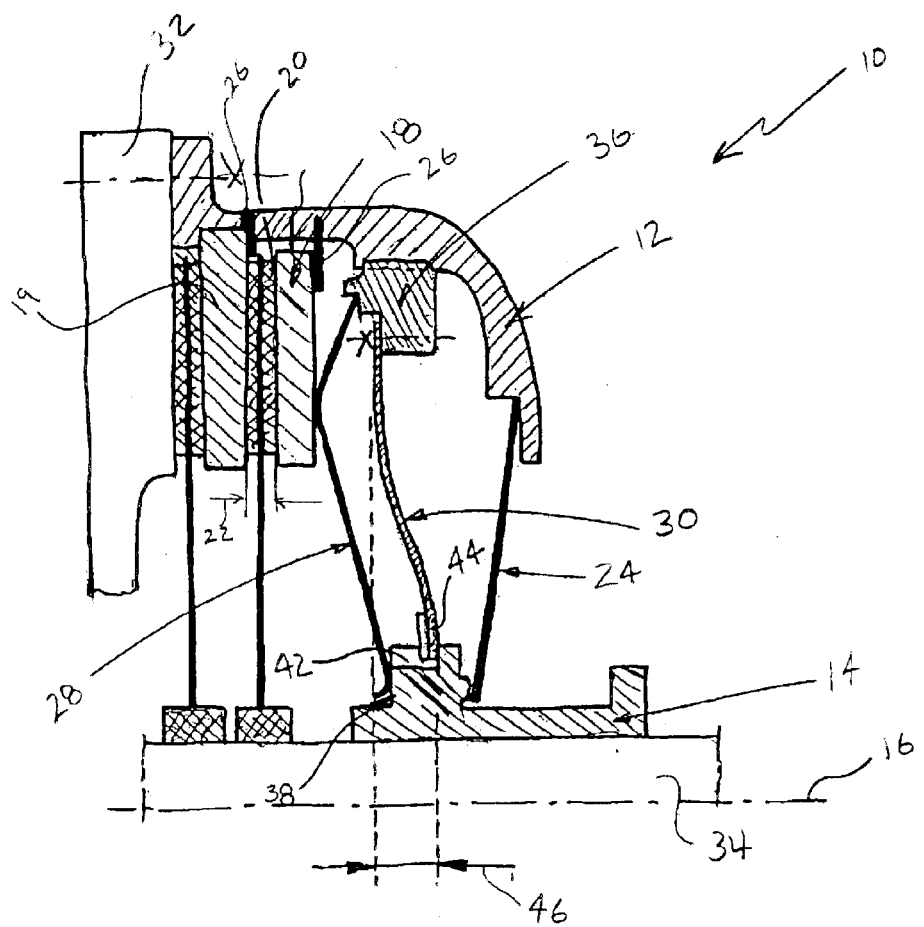
FIG. 1 is a cross sectional view of an engaged clutch assembly with new friction discs.

FIG. 1 is a cross-sectional view of a clutch assembly 10 for maintaining a substantially constant clamp load throughout various clutch wear conditions. The clutch assembly 10 illustrated in FIG. 1 is of a new clutch with a full width 22 of friction material disposed on the friction discs 20. The clutch assembly 10 includes a clutch cover 12 fastened to a flywheel 32 for rotation about an axis 16. A Pressure plate 18 and an intermediate plate 19 are operably associated with the clutch cover 12 such that the pressure and intermediate plates 18,19 each rotate with the clutch cover 12. The pressure plate 18 and intermediate plate 19 are movable longitudinally along the axis 16 to engage friction discs 20. Each friction disc 20 includes a quantity of friction material comprising a width 22 engagable between the flywheel 32 pressure plate 18 and intermediate plate 19. The pressure plate 18 and intermediate plate 19 are biased to a release position by a plurality of clutch straps 26. The clutch straps 26 are schematically illustrated and may be of any configuration known to one skilled in the art. Further, it is within the contemplation of this invention that any biasing member used to bias the pressure plate 18 and intermediate plate 19 away from the flywheel 32 as are known to one skilled within the art are within the scope of this invention. The release position is the configuration of the various components of the clutch assembly 10 to allow rotation where torque is not transferred from the flywheel 32 to a rotatable shaft 34 disposed along the axis 16.

A retainer bearing assembly 14 is disposed along the shaft 34 and rotates with the clutch cover 12. The retainer bearing assembly 14 moves axially along the shaft 34 to engage a lever 28. A diaphragm spring 24 biases the retainer bearing assembly 14 toward the flywheel 32 such that the lever 28 pushes against the pressure plate 18 to cause contact between the pressure plate 18, the intermediate plate 19, the friction disc 20 and the flywheel 32. The biasing force of the diaphragm spring 24 overcomes the opposing biasing force of the clutch straps 26 and applies a clamp load against the flywheel 32. The clamp load exerted by the diaphragm spring 24 allows for the transfer of torque to the friction discs 20.

Figure 2:
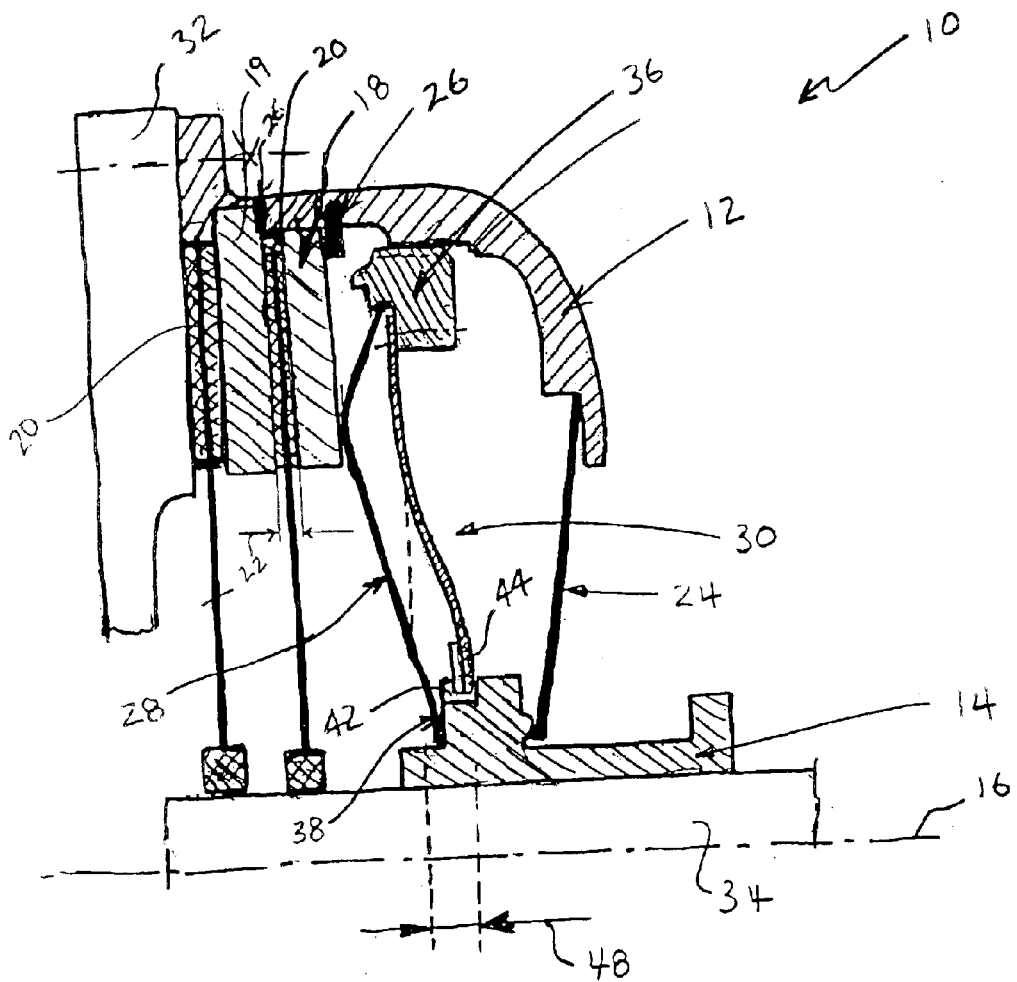
FIG. 2 is a cross sectional view of an engaged clutch assembly with a worn friction disc.

Referring to FIG. 2, during normal wear of the friction discs 20, a width 22 of the friction material decreases thereby requiring the retainer bearing assembly 14 to travel a greater longitudinal distance along the axis 16. The biasing load exerted by the diaphragm spring 24 on the retainer bearing assembly 14 decreases as the distance of travel along the axis 16 increases. Further, the biasing load exerted by the clutch straps 26 against the biasing load of the diaphragm spring 24 increases as the pressure plate 18 and intermediate plate 19 must move closer to the flywheel 32. This combination results in an overall lower clamp load. It is desirable to maintain a constant clamp load throughout the life of the friction disc 20 such that torque is transmitted in a substantially uniform manner.

An adjusting ring 36 is movably mounted within the clutch cover 12. The adjusting ring 36 supports one end of the lever 28. The adjusting ring 36 is manually adjusted to accommodate wear of the friction discs 20. This invention is also applicable to an automatically adjusted clutch assembly as is known to a worker skilled in the art. The second end of the lever 28 is supported and actuated by a surface 38 on the retaining bearing assembly 14. As the friction disc 20 wears, the adjusting ring 36 is moved toward the pressure plate 18 to account for wear. However, movement of the adjusting ring does not account for the changes in the total clamping force obtained by the interaction of the diaphragm spring 24 against the clutch straps 26. In the present invention, a resilient plate 30 is mounted to the adjusting ring 36 and includes a plurality of extending fingers 40 operably associated with the retainer bearing assembly 14.

Figure 3:
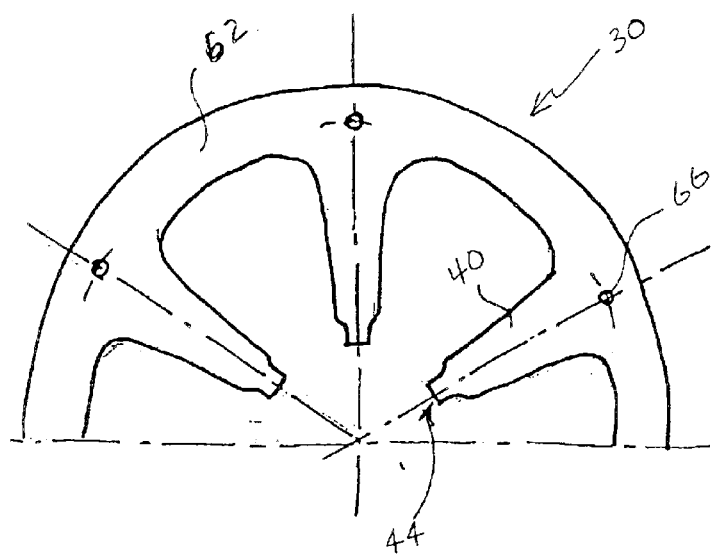
FIG. 3 is a partial plan view of a resilient plate.
Figure 4:
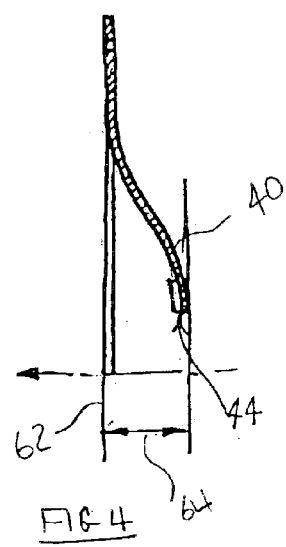
FIG. 4, is a cross-sectional view of one of the fingers of the resilient plate.

Referring to FIGS. 3 and 4, the fingers 40 of the resilient plate 30 extend radially from the outer diameter toward a center point. Preferably, there are six fingers 40 disposed at equal intervals about the circumference of the resilient plate 30. The fingers 40 radiate from the outer portion 62 toward a center of the resilient plate 30. Each of the fingers 40 includes an end 44 that extends from the outer portion 62 a distance 64. The outer portion 62 is mounted to the adjusting ring 36 by fasteners through openings 66. The extended fingers 44 deflect in response to movement of the retainer assembly 14. Each of the fingers 40 combine to exert a biasing force against the diaphragm spring 24 upon movement of the retainer assembly 14 toward the flywheel 32. The amount of biasing force exerted by the fingers 40 increases proportionally with deflection of the end 44 toward the plane 62 to reduce the distance 64.

Referring to FIGS. 1 and 2, the retainer bearing assembly 14 includes axial grooves 42 into which extend an end 44 of the fingers 40. The resilient plate 30 is fastened to the adjusting ring 36 by way of fasteners extending through openings 66 to rotate with the clutch cover 12. The fingers 40 slide axially within the axial grooves 42 of the retainer assembly 14, however, the fingers 40 prevent relative rotational movement of the retainer assembly 14 with respect to the clutch cover 12. The retainer assembly 14 therefore rotates with the clutch cover 12.

Figure 5:
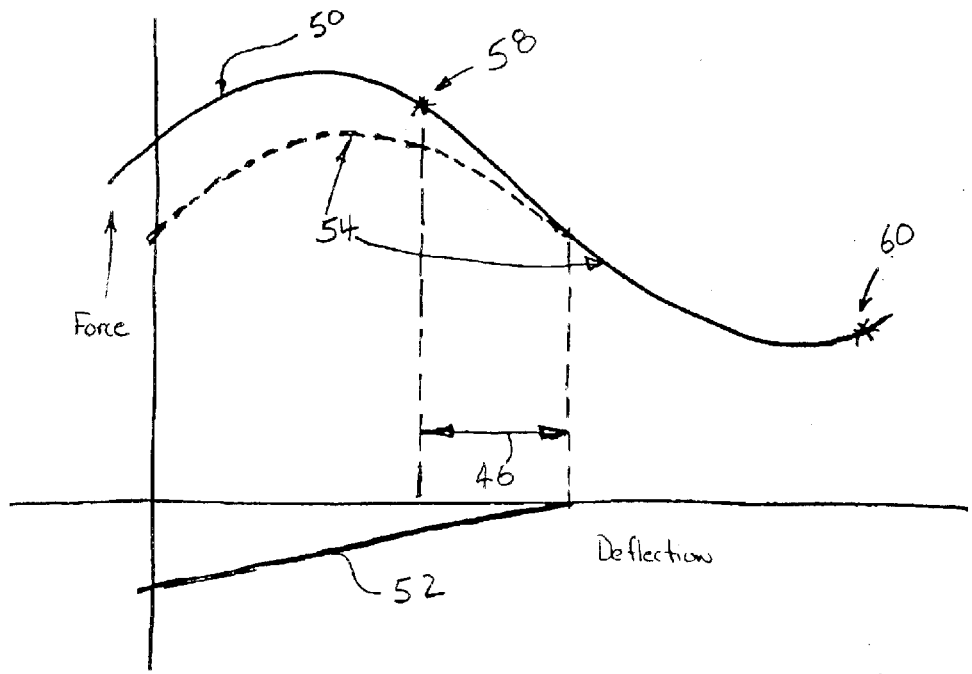
FIG. 5, is a graph illustrating spring forces for a new clutch.
Figure 6:
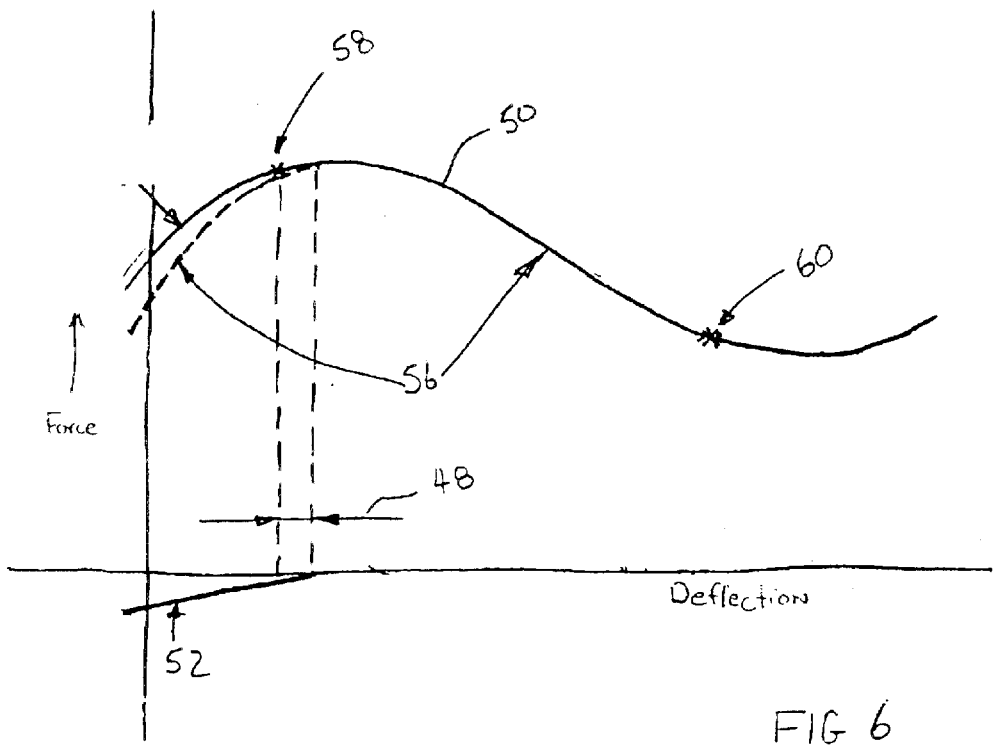
FIG. 6 is a graph illustrating spring forces for a worn clutch.

Referring to FIGS. 5 and 6, the force exerted by the resilient plate 30 over a given deflection is indicated at 52 and exerts a force against that exerted by the diaphragm spring 24 as indicated at 50 to provide a combined force indicated at 54. The combined force 50 is in the direction to bias the retainer assembly 14 toward the flywheel 32 against the biasing force of the clutch straps 26.

The retainer assembly travels between an engaged position indicated at 58 and a disengaged position, indicated at 60, such that the diaphragm spring 24 and the fingers 40 of the resilient plate 30 deflect to provide a combined biasing force 54. The fingers 40 of the resilient plate 30 slide axially within the groove 42 such that as the retainer assembly 14 moves toward the disengaged position 60 the fingers 40 are freed from engagement and no longer exert a biasing force. This creates a light pedal effect to decrease the pedal force required to release the clutch when the clutch is fully disengaged. The distance 46 represents engagement of the fingers 40 with the retainer assembly 14 for an unworn friction disc 20.

Wear of the friction disc 20 reduces the width 22, and the adjusting ring 36 is moved toward the flywheel 20 to compensate for the reduced width. The resilient plate 30 moves with the adjusting ring 36 such that the fingers 40 move further away from engagement with the retainer assembly 14, as shown in FIG. 6. This results in a reduction of the biasing force exerted by the resilient plate 30 against the diaphragm spring 24. Note that as the adjusting ring 36 moves closer to the flywheel 32 the biasing force exerted against the diaphragm spring 24 by the clutch straps 26 increases. The result of the increase in the clutch strap biasing force and the decrease in biasing force of resilient plate 30 is that a substantially uniform force is exerted on the diaphragm spring throughout the life of the friction disc 20. In other words, the clutch straps 26 and the resilient plate 30 exert a combined biasing force against the diaphragm spring 24. As the biasing force for the clutch straps 26 increases, the biasing force from the resilient plate decreases such that the combined biasing force against the diaphragm spring increases an insignificant amount.

Referring to FIGS. 1 and 2, during operation of the clutch assembly 10 the retainer assembly 14 is biased toward the flywheel 32 to engage the lever 28 such that pressure is applied to the friction discs against the flywheel 32. Clutch straps 26 bias the pressure plate 18 and intermediate plate 19 away from the flywheel 32 and against the biasing force exerted by the diaphragm spring 24. The resilient plate 30 combines with the biasing force of the clutch straps 26 against the diaphragm spring 24. When the friction disc 20 is substantially unworn, the biasing force exerted by the clutch straps is at a lowest, and the biasing force exerted by the resilient plate against the diaphragm spring 24 is highest. The fingers 40 of the resilient plate 30 slide within axial grooves of the retainer 14 such that the retainer assembly 14 rotates with the clutch cover 12. The fingers 40 of the resilient plate 30 engage the retainer assembly at a relatively early point during travel form a disengaged position 60 to an engaged position 58 (See FIGS. 5 and 6).

As the friction disc 20 wears and the adjusting ring 36 is moved toward the flywheel 32, the retainer assembly engages the fingers 40 later and later during travel from the disengaged position 60 to the engaged position. This results in less deflection of the fingers 40, and less biasing force against the diaphragm spring 24. Concurrently, as the adjusting ring 36 is adjusted towards the flywheel 32, the biasing force exerted by the clutch straps 26 increases. The increase in clutch strap biasing force is offset by the decrease in resilient plate 30 biasing force resulting in a substantially no change in the combined force exerted against the diaphragm spring 24 such that clamp loads remain substantially uniform over the useful life of the friction discs 20.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A clutch assembly comprising:
   a retainer assembly movable a distance between an engaged position and a release position;
   a retainer spring for biasing said retainer assembly toward said engaged position;
   at least one clutch spring operating to bias said retainer assembly toward said release position; and
   a resilient member operating to apply a biasing force on said retainer assembly toward said release position, said biasing force varying in response to a change in said distance between said engaged position and said release position wherein the biasing force decreases as the distance between the engaged position and the release position increases.

2. The assembly of claim 1, further including at least one friction disc disposed between at least one pressure plate and a driven disc, said pressure plate biased toward said release position by said clutch spring.

3. The assembly of claim 2, further including a clutch cover attached to rotate with the driven disc.

4. The assembly of claim 2 wherein wear of said friction discs is accommodated automatically by adjustment of said pressure plates.

5. The assembly of claim 2, further including at least one lever operably connected between said retainer assembly and a movable support to transmit said retainer spring biasing force to said pressure plate.

6. The assembly of claim 5 wherein said movable support is movable toward said friction disc to accommodate an increase in distance between said engaged position and said release position.

7. The assembly of claim 6 wherein said movable support is moved manually to accommodate for wear of said friction disc.

8. The assembly of claim 6 wherein said resilient member is a disc defining an inner diameter in associated with said retainer assembly, and an outer diameter associated with said movable support.

9. The assembly of claim 8 wherein said resilient member includes a plurality of fingers extending radially inward from said outer diameter.

10. The assembly of claim 9 wherein said retainer assembly includes axial grooves, and said fingers of said resilient member are engaged within said grooves.

11. The assembly of claim 1, wherein said retainer spring is a diaphragm.

12. A method of adjusting a clutch assembly to maintain a substantially constant mating position between a clutch bearing uniform clamp load during wear of a friction disc, said method comprising the following steps:
   a. moving a retainer assembly a distance between an engaged and a release position;
   b. biasing the retainer assembly toward the engaged position with a retainer spring;
   c. combining a biasing force of a clutch spring with a biasing force of a resilient member against the biasing force of the retainer spring; and
   d. varying the biasing force exerted by the resilient member in response to a change in the distance between the engaged position and the release position caused by wear of the friction disc wherein the biasing force decreases as the distance between the engaged position and the release position increases.

13. The method of claim 12, further including the step of preventing relative movement between the retainer assembly and the resilient member.

14. The method of claim 12, wherein the biasing force is varied by varying a point along the distance between the engaged and released positions at which the resilient member exerts the biasing force on the retainer assembly.

15. A clutch assembly comprising:
   at least one friction disc disposed between at least one pressure plate and a driven disc;
   a retainer assembly movable a distance between an engaged position and a release position separated by a distance, said retainer assembly having a plurality of axial grooves;
   a retainer spring for biasing said retainer assembly toward said engaged position;
   a movable support which is movable toward said friction disc to accommodate an increase in distance between said engaged position and said release position;
   at least one lever operably connected between said retainer assembly and said movable support to transmit said retainer spring biasing force to said at least one pressure plate;
   at least one clutch spring operating to bias said retainer assembly toward said release position; and a resilient member operating to apply a biasing force on said retainer assembly toward said release position, said biasing force varying in response to a change in said distance between said engaged position and said release position, said resilient member comprising a disc having an outer diameter associated with said movable support and a plurality of fingers extending radially inward from said outer diameter, said fingers engaging in said axial grooves in said retainer assembly.

16. A clutch assembly as in claim 15 wherein the biasing force decreases as the distance between the engaged position and the release position increases.

* * * * *